Nov. 15, 1932.  D. CRAIG  1,887,871
FULL VISION VISOR
Filed June 2, 1931
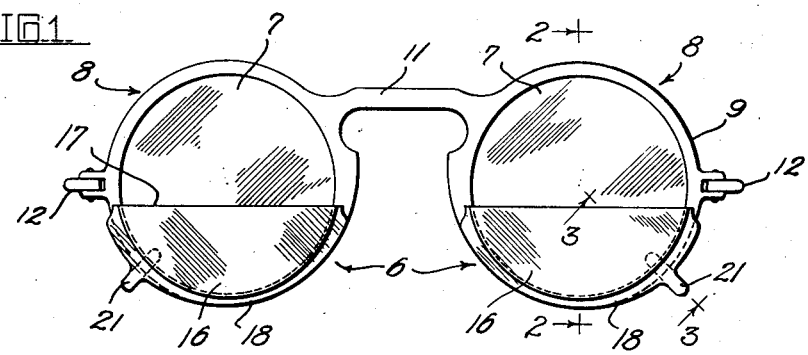
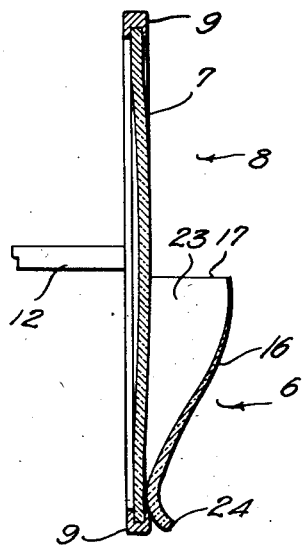
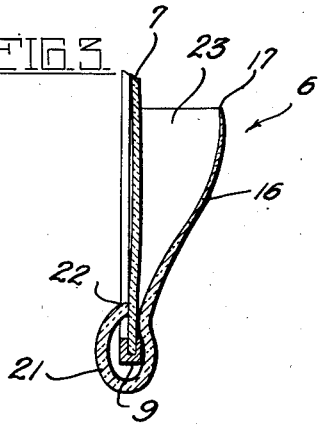
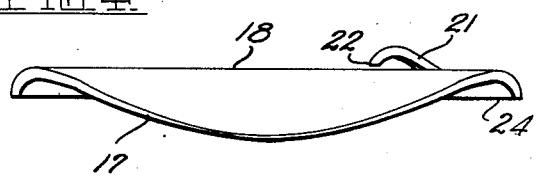
INVENTOR
DAVID CRAIG.
BY *Hazard and Miller*
ATTORNEYS.

Patented Nov. 15, 1932

1,887,871

UNITED STATES PATENT OFFICE

DAVID CRAIG, OF LOS ANGELES, CALIFORNIA

FULL VISION VISOR

Application filed June 2, 1931. Serial No. 541,622.

This invention relates to visors or glare shields, and has for an object the provision of a transparent glare shield colored to subdue the glare of light transmitted therethrough, and having sections of different thickness, so that the user may, by looking through different sections of the shield, vary the glare-subduing effect thereof.

Another object is to provide a graduated glare shield as described, which is adapted to be mounted upon conventional eyeglasses or spectacles, so as to offer the utmost convenience to the user by making it possible for him to receive the benefit of the glare shield without the necessity of providing mounting means for the glare shield in addition to his ordinary spectacles.

A further object is to provide a glare shield having the above described characteristics, in which the glare reducing element is transparent so that the user's vision therethrough is not impaired, the only effect being to reduce the glare of light from sources within the vision of the user.

A further object is to provide a glare shield as described, which is of a very simple and inexpensive construction, and which is adapted to be mounted in operative position with the utmost ease and with a minimum of inconvenience.

The invention possesses other objects and advantageous features, some of which, with those enumerated, will be set forth in the following description of the invention's particular embodiment which is illustrated in the drawing accompanying and forming a part of the specification.

Referring to the drawing:

Fig. 1 is a front elevation of a pair of conventional spectacles with glare shields embodying the principles of the present invention operatively mounted thereupon.

Fig. 2 is a transverse vertical sectional view taken upon the line 2—2 of Fig. 1, with the direction of view as indicated.

Fig. 3 is an oblique transverse view taken upon the line 3—3 of Fig. 1, with the direction of view as indicated, a portion of the figure being broken away to reduce its size.

Fig. 4 is a top plan view of one of the glare shields detached from the spectacles.

Referring to the drawing in detail, wherein like characters of reference denote like parts throughout, I have shown a pair of my improved glare shields 6 operatively mounted in superposed relation to the lenses 7 of a pair of conventional eyeglasses or spectacles 8. Whereas the shields 6 may be mounted on substantially any type of eyeglasses or spectacles, the spectacles 8 are of the "horn rim" variety, being provided with rims or bezels 9 joined by a bridge 11 and provided with bows 12 whereby the spectacles 8 may be worn in operative position with the lenses 7 disposed in front of the eyes of the wearer.

It is intended that a separate shield 6 be provided for each of the lenses 7. Each shield 6 comprises a body portion 16 of transparent material, such as celluloid, glass, or the like, although it is preferred that the material selected shall in addition to being transparent, be non-shatterable and preferably more or less flexible and resilient, so as to permit it to be received upon eyeglasses of various sizes and shapes and held in operative position thereupon, even though an accurate fit between the shields and the eyeglasses is not established.

The transparent material of which the body portion 16 is composed is colored, any of a relatively large number of colors being suitable for this use. For example, violet, amber, green, and smoke are colors which are especially serviceable in reducing the glare of light transmitted from light sources within the range of vision of the user.

The body portion 16 of each of the shields 6 has substantially the configuration of the segment of a circle, being defined by a straight upper edge 17 and an arc 18 at the bottom and so arranged that the body portion 16 extends throughout slightly less than a semi-circle. Furthermore, the curved edge or arc 18 of the body portion 16 is the arc of a circle, the radius of which is substantially equal to the radius of the lens 7 and/or rim or bezel 9 upon which the shield is to be secured, with the result that the arc or curved edge 18 will overlie the peripheral edge of the lens 7 when the shield 6 is mounted in superposed relation thereto.

The body portion 16 is provided with sections of different thickness so as to offer different degrees of light-subduing effect by permitting the user to direct his vision through the selected section. In other words, the body portion 16 is of gradually increasing thickness, the thinnest portion being preferably adjacent the center of the straight edge 17, from which point the body portion 16 is of gradually increasing thickness radially outwards of the curved edge 18. Hence, the color which is imparted to the body portion 16 may be of a rather delicate shade, inasmuch as the user may, by selecting a different section of the body portion 16 through which to direct his vision, increase the light-subduing effect because of the increased thickness, and hence increased density, of that section of the body portion through which he elects to look.

Means are provided for mounting the body portion 16 in superposed relation to one of the lenses 7. An aduncate resilient clip 21 composed preferably of the same material as that of which the body portion 16 is composed, extends from the arcuate edge 18, preferably at a position offset from the midpoint between the ends of the straight edge 17. This clip 21 is adapted to embrace the peripheral edge of the lens 7 and/or the rim or bezel 9, depending upon the type of eyeglasses or spectacles upon which the shield is mounted. If the lenses 7 of the eyeglasses are not provided with a rim or bezel, the inherent resilience of the clip 21 will serve to retain the body portion 16 in operative position simply by drawing the arcuate edge 18 thereof into frictional engagement with the outer surface of the lens 7 adjacent its peripheral edge. However, if the spectacles are provided with a rim or bezel, the extreme end 22 of the clip 21 is adapted to snap behind the rim and to engage the inner edge thereof, as clearly shown upon Fig. 3, thereby increasing the firmness with which the visor 6 is mounted upon the spectacles. The clip 21 is relatively long, leaving a material space between the bottom of the clip and the rim 9 so that the shield may be slid further onto the lens. This enables adjustment of the horizontal top edge of the shield with respect to the center of the lens 7.

Whereas the arcuate edge 18 lies substantially in a flat plane, the straight edge 17 is bowed outwards from that plane, with the result that the body portion 16 has substantially the configuration of a portion of a sphere. This particular configuration facilitates mounting the device in operative position, because of the fact that the curved edge of the lens 7 which leads as it is thrust past the straight edge 17 toward the arcuate edge 18, is permitted to fit into the more or less funnel-shaped space 23 behind the body portion 16, and by continued motion downwards toward the arcuate edge 18 to pass between the arcuate edge 18 and the end 22 of the clip 21. Another advantage of this particular configuration lies in the fact that the surfaces of the body portion 16 are more nearly perpendicular to the line of vision of the user therethrough, regardless of which portion of the glare shield the vision is passing through at any particular time. Adjacent the arcuate edge 18, the body portion 16 is deflected outwards as indicated at 24, so that instead of having its extreme edge seat against the lens or bezel, the rounded portion 26 seats against the outer face of the lens along a line spaced from the edge of the lens and from the bezel if the eyeglasses are of the type provided with a bezel.

Although the shields 6 may be mounted upon either the upper or lower edges of the lenses 7, the general configuration of the body portions 16 and the clips 21 permitting installation in either position, I prefer that they be mounted so as to cover the lower portions of the lenses 7, as clearly illustrated upon Figs. 1, 2 and 3. The reason for this is that I intend the glare shields to be used principally by automobile drivers who desire protection against the glare of the headlights from automobiles headed in the direction opposite to that in which the driver's car is traveling, inasmuch as these lights are usually at a lower elevation than the eyes of the driver, and it is easier to interpose the shields between the driver's eyes and the glaring lights simply by raising the head slightly. Inasmuch as the body portions 16 of the shields 6 are transparent, the visors are of the full vision type, i. e., no portion thereof interferes with the normal vision of the wearer to any extent other than reducing or stopping the glare of light emanating from sources within the wearer's line of vision. Because of the fact that the visors 6 are mounted upon the wearer's ordinary spectacles practically no effort is necessary to move the visors so as to interpose them between the wearer's eyes and any offending light source, and because of the graduated thickness of each of the body portions 16, just the degree of glare-subduing effect may be attained by moving the head only far enough to interpose the proper portion or portion of proper thickness of the body portions 16 before the pupils of the eyes.

It is to be understood that the details of the invention as herein disclosed, are subject to alteration within the spirit or scope of the appended claims.

I claim:

1. A visor or glare shield for use in conjunction with spectacles, eye glasses and the like, comprising a concavo-convex member formed of transparent material colored to subdue the glare of light transmitted therethrough, said member being shaped in plan to substantially cover only a portion of a spectacle lens, having one straight edge and one arcuate edge, there being an aduncate clip on the arcuate edge extending upwardly over the concave side of the member for fastening the device to the spectacle lens, the arcuate edge being outwardly deflected so as not to engage the edge of the lens or the surrounding frame to limit the position of the member with respect thereto whereby the member may be applied to many types of lenses and may have its position with respect to the centers thereof adjusted.

2. A visor or glare shield for use in conjunction with spectacles, eye glasses and the like, comprising a concavo-convex member formed of transparent material colored to subdue the glare of light transmitted therethrough, said member being shaped in plan to substantially cover only a portion of a spectacle lens, having one straight edge and one arcuate edge, there being an aduncate clip on the arcuate edge extending upwardly over the concave side of the member for fastening the device to the spectacle lens, the arcuate edge being outwardly deflected so as not to engage the edge of the lens or the surrounding frame to limit the position of the member with respect thereto whereby the member may be applied to many types of lenses and may have its position with respect to the centers thereof adjusted, said member tapering in thickness from the center of its straight edge toward the arcuate edge.

In testimony whereof I have signed my name to this specification.

DAVID CRAIG.